Jan. 7, 1930. G. K. RICHARDSON 1,742,934
TROLLING SPOON
Filed Oct. 23, 1928
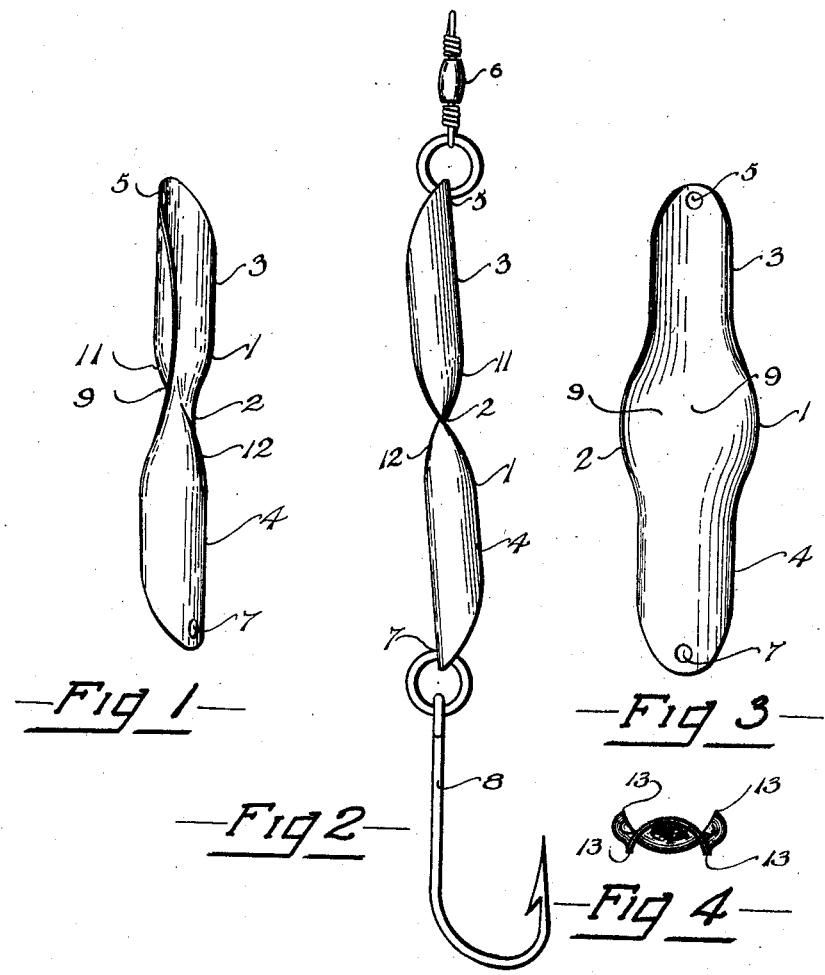
George Kenneth Richardson
INVENTOR
Ross Thomson
ATTORNEY Patented Jan. 7, 1930

1,742,934

UNITED STATES PATENT OFFICE

GEORGE KENNETH RICHARDSON, OF VANCOUVER, BRITISH COLUMBIA, CANADA

TROLLING SPOON

Application filed October 23, 1928. Serial No. 314,385.

The invention relates to improvements in trolling spoons as described in the present specification and illustrated in the drawings that form part of the same.

The invention consists essentially of the novel shaping of a piece of metal so as to form longitudinally shaped troughs oppositely disposed one to the other.

The objects of the invention being to provide a spoon that when being towed through the water will have a wobbling zig-zag motion with a frequent erratic leaping action, thus offering an increased reflecting surface as a means of luring fish.

In the drawings:

Figure 1 is a perspective view of my spoon.
Figure 2 is a side view of my invention.
Figure 3 is a plan view of my invention.
Figure 4 is an end view of my invention.

Referring to the drawings:

Like numerals of reference indicate corresponding parts in each figure.

In the drawings, 1 represents a trolling spoon stamped from metal into an ellipsoidal plane in such manner as to provide from approximately the center 2 thereof a longitudinally extending trough end 3 on one side and a longitudinally extending trough end 4 on the opposite side thereof, the end trough 3 provided with an aperture 5 adapted to receive a line swivel 6 and being of slightly smaller radius than the trough end 4, the trough end 4 provided with an aperture 7, adapted to receive a hook 8.

It will be seen that by forming troughs 3 and 4 from flat material, said troughs being oppositely curved, that the centre portion 9 is unchanged in width, while it narrows toward the trough brims 13, providing a continually varying curvilinear formation parallel with the line of axis of tow, and resulting in partial ellipsoidal surfaces at 11 and 12.

In operation it will be found that the towing of the spoon through the water will result in a zig-zag action, this travel and action being due to resistance offered by the water to the surface 12 and sides of the respective troughs, the said surfaces and sides affording a maximum of reflection resulting in oscillation and alternation of parallel, curved convex and concave reflecting surfaces producing an efficient and attractive lure for fish.

What I claim is:

In fish trolling spoons wherein a piece of oval shaped material is formed in such manner as to provide two oppositely disposed trough ends, the central portion thereof being unchanged in width by such formation, while extensions from the centre pass from a straight line effect into arc formation, said arcs being oppositely disposed towards each other, the aforementioned troughs conforming to said arcs, said arcs being of different radii thus producing a longitudinally varying curvilinear formation, the aforementioned trough ends having suitable apertures adapted to receive a line swivel, and hook respectively.

GEORGE KENNETH RICHARDSON.